Patented Jan. 22, 1946

2,393,348

UNITED STATES PATENT OFFICE 2,393,348

METHOD FOR COAGULATING LATICES

Wendell W. Waterman and Byron M. Vanderbilt, Cranford, N. J., assignors, by mesne assignments, to Jasco, Incorporated, a corporation of Louisiana No Drawing. Application August 19, 1941, Serial No. 407,476

6 Claims. (Cl. 260—84.5)

This application relates to rubber-like synthetic polymers; relates particularly to plastic interpolymers of the "Buna" type prepared by emulsion polymerization, which are suitable for replacement of natural rubber; and relates especially to means for the coagulation and separation of such materials from the emulsion in which they are produced.

It is well known in the art that when diolefins such as butadiene, isoprene, piperylene, dimethylbutadiene and the like, either alone or in admixture with other olefinic materials such as styrene, or acrylonitrile, or methyl methacrylate, or divinyl naphthalene, or the like, are formed into an emulsion, they tend to polymerize into relatively high molecular weight polymers or copolymers having many of the physical and chemical characteristics of rubber. The polymerization mixture ordinarily consists of approximately 200 parts of water with 100 parts of the olefinic material, whether mainly a diolefin, or preferably a mixture of the diolefin with other polymerizable compounds; ordinarily contains approximately 1 to 6 parts of an emulsifier such as sodium oleate or other soap; or water soluble emulsifier; and ordinarily contains approximately 0.1 to 1.0 part of a peroxide as catalyst, the peroxide catalyst ordinarily being hydrogen peroxide, or an inorganic persulfate, or a perborate, or benzoyl peroxide, or the like. The polymerization is ordinarily conducted at a temperature ranging between 30° C. and 60° C. The rubber-like material obtained is in the form of a stable emulsion or latex, which must be coagulated in order to obtain the product in solid form suitable for most industrial uses.

Great difficulty has, however, been experienced in finding a satisfactory method for coagulating such latices in a manner so that the coagulated material can be washed free of the emulsifying agent and other water soluble impurities by simple and economic methods. When using a water-soluble soap as emulsifier the emulsion is preferably coagulated either by adding the theoretical amount of acid in order to destroy the soap or by adding an inorganic salt in sufficient quantity to "salt out" the dispersed rubber-like material.

The first method is unsatisfactory because the fatty acid from the soap remains in the coagulated rubber and can only be removed by extraction with organic solvents. Also the coagulate so obtained is in the form of a coherent mass and in order to wash out the occluded water-soluble materials it is necessary to carry out the washing step on a mill, in a kneader, or to subject the material to some other form of mastication which is capable of bringing the water into intimate contact with all of the coagulate.

When carrying out the coagulation by means of a neutral or alkaline inorganic salt such as sodium chloride, the emulsion is destroyed but the soap remains unchanged and is simply coagulated along with the rubber-like material. As disclosed in application Ser. No. 365,012 of Vanderbilt and Beekley, filed November 9, 1940, the size of the coagulated particles can be regulated by pH control. It is thus possible to adjust the particle size so that the material can be readily filtered by means of rotary-vacuum, or filter-press type filters. The particles can also be obtained sufficiently small so that the emulsifier and other water-soluble materials can be nearly completely removed by simply leaching with water. Although this method of coagulating is especially applicable when using water-soluble soaps as emulsifiers, it is also advantageously used when the emulsifier consists of salts of sulfated alcohols, alkylated naphthalene sulfonates, alkyl amine salts, and the like.

When coagulating synthetic rubber-like latices in the form of fine particles, they are conveniently separated from the liquor by means of a rotary suction filter. It is well known that emulsifying and wetting agents are difficult to wash from solid materials. For this reason it is desirable to take the filter cake after the first filtration and to redisperse it in water and let it be contacted by the water for about 10 to 30 minutes. The coagulate is again filtered and washed with water to remove the adhering liquor. The rubber-like material so obtained is suitable for drying and is practically free of all water-soluble materials.

The softness or plasticity of "Buna type" rubbers depends upon the conditions employed when preparing them. The plasticities of synthetic and natural rubbers are conveniently determined by means of the Williams plastometer as described by Williams, Industrial and Engineering Chemistry, volume 16, page 362 of the year 1924. In this test the deformation and recovery of a 2 cc. pellet of the rubber in question are determined under standard conditions of temperature, pressure and time.

It has been found that when latices of rubber having Williams plasticities less than about 175–75 are coagulated by means of inorganic salts to form small particles suitable for filtering and washing, the particles are sufficiently sticky or tacky so that they adhere together on standing or filtering. Since it is highly desirable, and in most cases necessary, to prepare rubbers of a Williams plasticity of 160–30 or even lower in order that they may be satisfactorily compounded and processed in subsequent operations, it has previously been impossible to coagulate plastic synthetic rubber latices in the form of fine particles and to filter and wash them by conventional type equipment. The particles tend to stick together and cannot be picked up by means of a rotary-vacuum type filter unless the coagulate is filtered soon after the coagulation has been carried out. Even when this is done the filter cake resulting from the filtration constitutes a coherent mass and cannot be easily redispersed into particles of the size obtained in the coagulation.

The present invention is based upon the discovery that if the coagulation is conducted in the presence of a small, somewhat critical, proportion of low boiling hydrocarbon, such as butadiene or the like, a much reduced amount of coagulant is required, and the coagulate is thrown down in a much more granular and less sticky form than in the absence of the hydrocarbon. Also the coagulate may be obtained in uniform particles, of any desired size, which are particularly easy to wash free from catalyst, emulsifier, coagulant, and other water-soluble impurities. By this process latices of synthetic rubbers having a Williams plasticity value as low as 50–0, can be coagulated, filtered, reslurried in water, and again filtered without the coagulated particles sticking or adhering together.

Thus an object of the invention is to coagulate a synthetic rubber latex in the presence of a low boiling hydrocarbon liquid, preferably butadiene, present in a critical amount, to form the coagulate into a granular, easily washable, easily redispersable material. Other objects and details of the invention will be apparent from the following description.

A Buna type synthetic rubber is conveniently prepared by reaction in emulsion form in water of butadiene, as such, or butadiene with various amounts of other polymerizable unsaturates such as acrylonitrile and styrene. These various additional copolymerizates may be present in the ratio of from 5% to 50% of the polymerization mixture; and are desirably accompanied by an emulsifier dissolved in the aqueous phase of the emulsion. This emulsifier may be sodium laurate in the proportion of approximately 3% of the water present; or may be sodium oleate or sodium stearate, or other appropriate emulsifying agents. The mixture also probably contains a peroxide type catalyst such as sodium perborate, or potassium persulfate, or hydrogen peroxide, any of which are desirably present in the proportion of from 0.05 to 4 or 5 parts per 100 parts of water present. This mixture is desirably prepared in a pressure vessel equipped with efficient stirring means. A suitable modifying agent such as diisopropyl xanthogen disulfide in the proportion of from about 0.2 to 0.8 part may also be added to the reaction mixture. The emulsion is maintained preferably by continuous stirring of the mixture and the temperature of the mixture is brought up to approximately 30° C. to 45° C. The polymerization begins promptly and may be continued for a time interval of from 3 to 20 hours, at the end of which interval the polymerization has taken place to a degree of 70–90% at which point the reaction is conveniently stopped by the addition of a few percent of phenyl beta naphthylamine in dissolved or dispersed form.

It has been customary at this stage to "flash off" the unreacted butadiene by releasing the pressure of the warm polymerization mixture to atmospheric pressure; and to remove the unreacted mono-olefinic constituent, such as acrylonitrile, by passing live steam through the mixture. This procedure leaves the copolymer in the form of a stable emulsion or latex free of monomers. In order to obtain the rubber in solid form the precipitation has customarily been conducted by the addition to the emulsion of an equal volume of saturated brine, preferably sodium chloride brine, although other brines such as potassium chloride, sodium sulfate and the like are sometimes usable.

In practicing the present invention, 1 to 5% of a low boiling hydrocarbon such as butadiene is thoroughly mixed with the stripped latex at ordinary or somewhat elevated temperatures prior to adding the brine. The resulting coagulate is formed as granular particles 0.05 to 1 millimeter in diameter, which may be filtered and washed without the particles forming any agglomerations.

*Example 1*

An emulsion of Buna type synthetic rubber was prepared by placing in a pressure vessel approximately 200 parts of water, 75 parts of butadiene, 25 parts of acrylonitrile, 6 parts of sodium laurate (previously dissolved in a portion of the water), and 1 part of sodium perborate, together with 0.5 part of diisopropyl xanthogen disulfide. This mixture was rapidly stirred through the entire reaction interval. The mixture was initially warmed to a temperature of 30° C. and was maintained within the range of temperatures between 30° C. and 50° C. for a period of approximately 10 hours. At the end of this time the mixture was found to have reacted to produce approximately 70% of the original reactants of a solid polymer emulsion. The pressure of butadiene in the mixture was then released to remove a major portion of the butadiene, and the emulsion was then stripped with a current of steam to remove the unreacted acrylonitrile and any residual unreacted butadiene. The resulting stripped emulsion contained approximately 24% of solid polymeric material.

*Example 2*

A portion of a latex prepared as in Example 1 containing 25% of a butadiene-acrylonitrile polymer and 2% of sodium laurate as emulsifier was treated with an equal volume of saturated sodium chloride brine. The emulsion coagulated promptly in the form of fine particles which yielded a tough, coherent cake upon subsequent filtration on a suction filter which resisted disintegration into smaller particles by stirring or vigorous mechanical agitation, and could not be washed free from the catalyst or emulsifier. The coagulate was found to have a Williams plasticity of 128–5.

*Example 3*

5 parts of the latex emulsion of Example 1 were placed in a pressure vessel and 3 parts of liquid butadiene were added under pressure. The materials were well mixed by shaking and then 4 parts of saturated sodium chloride brine were added with continued good mixing. The rubber was coagulated into a single, coherent mass, which could not be washed free of emulsifier unless washed on a rubber mill or the like and was unsuitable for spray washing or other similar treatment.

Example 4

5 parts of the latex of Example 1 were placed in a pressure vessel and 0.5 part of liquid butadiene was added with thorough mixing, and then 2.5 parts of saturated sodium chloride brine was added with continued stirring. The solid polymer precipitated in the form of coarse particles which showed no tendency to adhere to each other upon standing in the coagulant liquor or on the filter. They were in particularly satisfactory form for filtration, but were somewhat too large to allow of complete removal of the emulsifying agent and brine merely by spray or otherwise contacting with water.

Example 5

5 parts of the latex emulsion of Example 1 were placed in a pressure vessel as in Examples 3 and 4, and 0.17 part of liquid butadiene was added with rapid stirring and then 3 parts of saturated sodium chloride brine were added to precipitate the emulsion. The resulting coagulate was obtained in the form of spherical particles averaging about 1 millimeter in diameter. On the filter, the coagulate particles did not stick together and were in particularly good condition for thorough and adequate washing with water to remove the emulsifier, the catalyst and the brine coagulant. On the filter the particles did not "channel" to permit the passage of unused wash water. These particles were in particularly advantageous form for re-mixing with water in order to dissolve out the coagulated soap. On a second filtration to remove the dissolved soap, no channeling or adhering occurred.

Example 6

5 parts of the latex emulsion of Example 1 were placed in a pressure vessel and 0.08 part of liquid butadiene was added to the latex with vigorous stirring. 3 parts of saturated sodium chloride brine were then added to precipitate the solid polymer. The resulting coagulate was obtained in the form of exceedingly fine particles, which however were large enough to filter out from the solution. However, although they tended to stick together on contact with each other whether in the coagulate liquor or on the filter, they were less adherent than the particles of Example 2.

This series of examples shows that the particle size of the coagulate in a function of the amount of butadiene present during the coagulation; and further shows that approximately 2% of the butadiene in the latex yields the most advantageous form of coagulate for subsequent washing and re-dispersion.

Example 7

5 parts of the latex emulsion of Example 1 were placed in a pressure vessel as in Example 3 and 0.17 part of butane were added with rapid stirring to the emulsion. Thereafter, 3 parts of saturated sodium chloride brine were added also with rapid stirring to the emulsion. The solid polymer coagulated in the form of relatively coarse granules, having a character between the character of coagulate obtained by Example 4, and that obtained by Example 5.

Similar experiments have shown that other low boiling hydrocarbons such as propane, propylene, isobutylene, isoprene and the like may be employed, but butadiene has proven superior under those conditions tried to date.

It may be noted that for the coagulation of the latex in the absence of volatile hydrocarbons, approximately equal parts of saturated brine solution and latex are required to obtain complete precipitation of the solid polymer; whereas in the presence of the volatile hydrocarbon, approximately ½ volume of brine per volume of latex is required for complete precipitation. This effects a valuable saving in brine or other inorganic salt employed. The butadiene is readily recovered merely by volatilization at atmospheric temperature or slightly above and condensation of the pure gaseous butadiene.

It is not necessary that the acrylonitrile be removed before the coagulation is conducted. Instead, the polymerization is conducted to the desired percentage yield, and the emulsion is then allowed to boil slowly, removing excess butadiene until approximately 10% of the original butadiene charged remains in the emulsion, together with substantially all of the unpolymerized acrylonitrile. This mixture, with the controlled amount of residual butadiene, is then precipitated in the pressure vessel by the addition of approximately 2.5 parts of saturated brine solution per 5 parts of latex emulsion to yield a similar highly advantageous coagulate. The pressure may then be released from the vessel to volatilize out the residual butadiene and the solid may be filtered out, leaving a brine solution of residual acrylonitrile in water, from which the acrylonitrile is readily removed by steam. If desired the reaction may be carried out until approximately only 10% of the original butadiene is present and then the coagulation carried out without either the addition or removal of any butadiene.

The invention is particularly applicable to latex emulsions of polybutadiene, and polybutadiene-acrylonitrile or polybutadiene-styrene. It is, also, similarly usable with other rubbery emulsions in general including polychloroprene emulsions and natural rubber latex.

Thus the invention consists of the step of coagulating a latex emulsion by the application thereto of a salt or brine in the presence of a controlled amount of a volatile hydrocarbon to determine the particle size of the coagulate and to determine the adhesiveness of the coagulate, as well as to facilitate filtration and washing.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. In the process for polymerizing a butadiene mixture in aqueous emulsion form by the application thereto of an emulsifier and a polymerization catalyst to yield a solid polymer emulsion in water, the steps of maintaining in the polymer latex in water a quantity of butadiene within the range of 1% to 6% of the amount of aqueous emulsion and coagulating the emulsion in the presence of butadiene by adding thereto a brine solution.

2. In the process for preparing a solid polymer by polymerization of a butadiene-acrylonitrile mixture in aqueous emulsion form through the application of an emulsifier and a polymerization catalyst, the steps of maintaining in the polymer emulsion a substantial quantity of butadiene within the range of 0.5% to 10%, and coagulating the emulsion in the presence of the butadiene.

3. In the process for preparing a solid polymer by polymerization of a butadiene-acrylonitrile mixture in aqueous emulsion form through the application of an emulsifier and a polymerization catalyst, the steps of retaining in the polymer emulsion in water approximately 5%, on the total aqueous emulsion, of butadiene, and coagulating the emulsion in the presence of the butadiene by adding thereto a brine solution.

4. In the process for preparing a solid polymer by polymerization of a butadiene-acrylonitrile mixture in aqueous emulsion form through the application of an emulsifier and a polymerization catalyst, the steps of maintaining in the polymer emulsioin in water 0.5% to 10%, on the total aqueous emulsion, of butadiene, and coagulating the aqueous emulsion in the presence of the butadiene by adding thereto a brine solution.

5. In the process for preparing a solid polymer by polymerization of a butadiene-acrylonitrile mixture in aqueous emulsion form through the application of an emulsifier and a polymerization catalyst, the steps of conducting the polymerization to partial completeness only, volatilizing out a portion of the unreacted butadiene so as to retain in the aqueous emulsion a controlled amount within the range of 0.5% to 10% of butadiene and coagulating the aqueous emulsion in the presence of the butadiene.

6. In the process for preparing a solid polymer by polymerization of a butadiene-acrylonitrile mixture in aqueous emulsion form through the application of an emulsifier and a polymerization catalyst, the steps of conducting the polymerization to partial completeness only, volatilizing out the unreacted butadiene, stripping out the unreacted acrylonitrile, adding to the residual aqueous emulsion a predetermined amount of pure butadiene within the range of 0.5% to 10% on the amount of aqueous emulsion and coagulating the aqueous emulsion in the presence of the pure butadiene.

WENDELL W. WATERMAN.
BYRON M. VANDERBILT.